US009151579B2

(12) United States Patent
Martineau et al.

(10) Patent No.: US 9,151,579 B2
(45) Date of Patent: Oct. 6, 2015

(54) NON-CIRCULAR CROSS-SECTION MISSILE COMPONENTS, MISSILES INCORPORATING SAME, AND METHODS OF OPERATION

(75) Inventors: Phillip R. Martineau, Salt Lake City, UT (US); Christopher J. Sullivan, Sandy, UT (US); David W. Hull, Magna, UT (US); Steven C. Sara, South Jordan, UT (US)

(73) Assignee: ORBITAL ATK, INC., Dulles, VA (US)

( * ) Notice: Subject to any disclaimer, the term of this patent is extended or adjusted under 35 U.S.C. 154(b) by 1326 days.

(21) Appl. No.: 12/410,283

(22) Filed: Mar. 24, 2009

(65) Prior Publication Data
US 2010/0242772 A1 Sep. 30, 2010

(51) Int. Cl.
F42B 5/02 (2006.01)
F02K 9/34 (2006.01)
F02K 9/10 (2006.01)
F42B 5/00 (2006.01)
B64G 1/00 (2006.01)
B64G 1/40 (2006.01)
F42B 15/00 (2006.01)

(52) U.S. Cl.
CPC ............... F42B 5/025 (2013.01); B64G 1/002 (2013.01); B64G 1/403 (2013.01); F02K 9/10 (2013.01); F02K 9/34 (2013.01); F42B 5/00 (2013.01); F42B 15/00 (2013.01)

(58) Field of Classification Search
CPC ............. F02K 9/34; F02K 3/346; F02K 9/10; F02K 9/36; F42B 15/00; F42B 1/00; F42B 1/028; F42B 1/032
USPC ................ 60/253, 255; 244/63; 102/374, 380
See application file for complete search history.

(56) References Cited

U.S. PATENT DOCUMENTS

| | | | | |
|---|---|---|---|---|
| 2,956,401 A * | 10/1960 | Kane | | 60/250 |
| 3,120,100 A * | 2/1964 | Ozanich | | 60/251 |
| 3,364,809 A * | 1/1968 | Hinderer | | 86/1.1 |
| 4,000,682 A * | 1/1977 | Thibodaux et al. | | 86/1.1 |
| 5,206,989 A * | 5/1993 | Smith et al. | | 29/890.01 |
| 5,225,627 A * | 7/1993 | Phillips et al. | | 102/351 |
| 5,309,712 A * | 5/1994 | Mund, Jr. | | 60/253 |
| 5,677,508 A | 10/1997 | Finn et al. | | |
| 6,148,606 A * | 11/2000 | Grossi et al. | | 60/223 |
| 6,584,882 B2 * | 7/2003 | Briggs et al. | | 89/1.817 |
| 7,966,805 B2 * | 6/2011 | Loehr | | 60/218 |

* cited by examiner

*Primary Examiner* — Gerald L Sung
(74) *Attorney, Agent, or Firm* — TraskBritt

(57) ABSTRACT

A missile component such as a rocket motor case, of an initial transverse cross-sectional shape flexible into another, different cross-section responsive to application of internal pressure from ignition of a propellant grain within the component. A missile launch assembly including at least one missile of a non-circular cross-section disposed within a segment of a partitioned circular launch tube. A multi-stage missile comprising at least a first stage and a second stage having rocket motor cases of non-circular transverse cross-section, the rocket motor case of at least one of the stages being deformable into another, different cross-section. A method of launching a missile including igniting a rocket motor of a missile component having a first cross-section, internally pressurizing the missile component substantially concurrently with motor ignition and flexing the component rocket motor into a second, different cross-sectional shape.

22 Claims, 3 Drawing Sheets

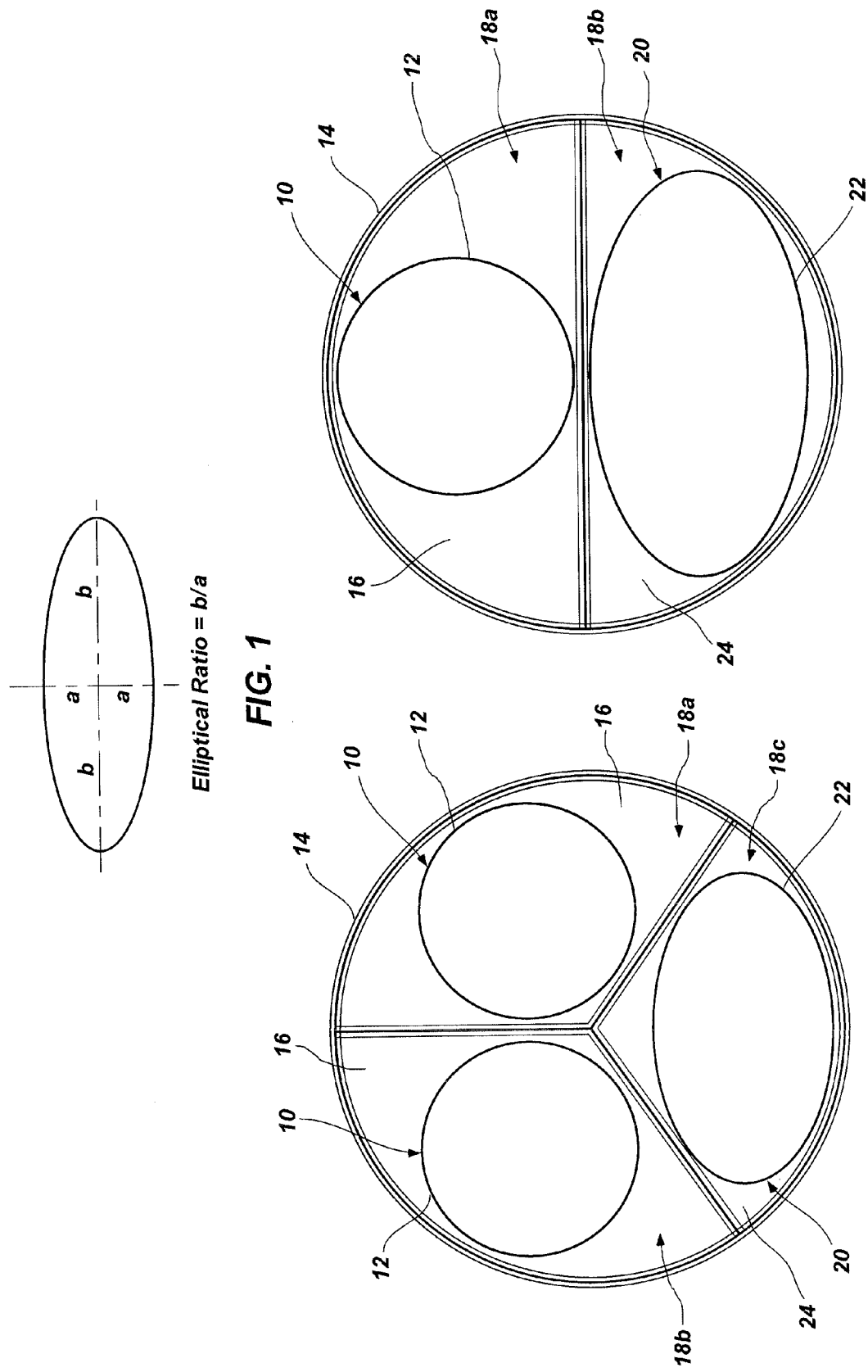

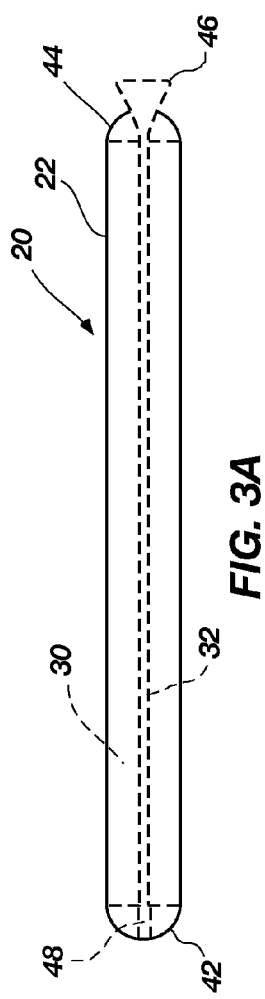
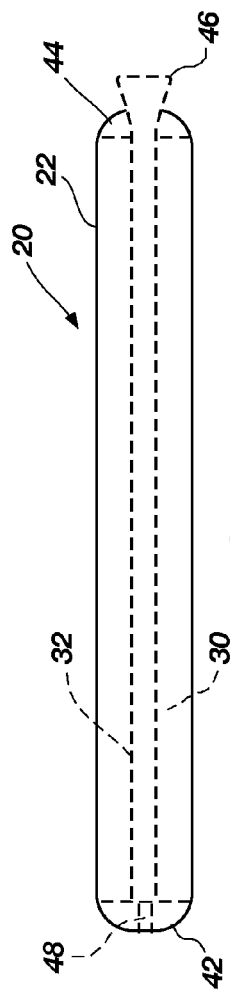
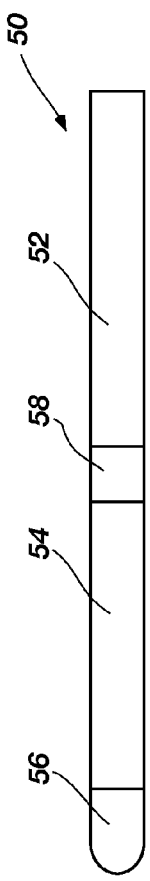
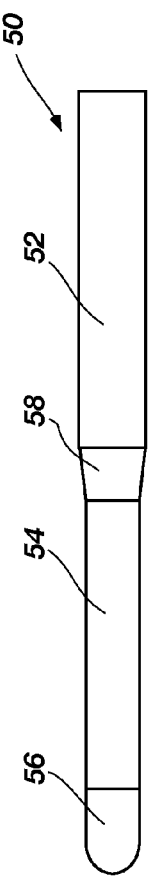

NON-CIRCULAR CROSS-SECTION MISSILE COMPONENTS, MISSILES INCORPORATING SAME, AND METHODS OF OPERATION

TECHNICAL FIELD

Embodiments of the present invention relate to design, fabrication and operation of rocket-propelled aerospace vehicles in the form of so-called "guided missiles." More specifically, embodiments of the present invention relate to guided missiles having a component, such as a rocket motor case containing a propellant grain, with an initial, non-circular transverse cross-sectional shape, which deforms to a second, different transverse cross-sectional shape responsive to internal pressure generated upon ignition of a propellant grain disposed within the case. Other embodiments relate to a missile launch assembly comprising a partitioned, circular launch tube and a missile having at least a portion of a non-circular transverse cross-section disposed in a segment thereof.

BACKGROUND

Submarine-launched ballistic missiles have been in place for decades. In conventional submarine launch platforms, such as Trident submarines as deployed by the United States Navy, one missile per launch tube was the initial deployment. The missiles are conventionally ejected from the launch tubes using steam. This one-missile-per-tube approach severely restricts the number of missiles that may be carried.

It has been proposed to partition launch tubes, which are conventionally of circular cross-sectional shape, to enable two or even three missiles to be carried per tube. While increasing the number of missile payloads per submarine, partitioning a launch tube severely constrains the diameter of circular cross-section missiles that may be placed in the tube and, consequently, limits the propellant loading (volume) for such a missile, adversely affecting the range of the missile.

In the case of a partitioned missile launch tube, loading with circular cross-section missiles results in significant unused cross-sectional volume in a given launch tube.

Air-to-air missiles having a propulsion section of non-circular and, specifically, elliptical, transverse cross-section have been proposed. See, for example, U.S. Pat. No. 5,677,508. However, such missiles, as described, remain in their initial, elliptical shape during flight.

Consequently, it would be desirable to develop a missile configuration that would enable more efficient use of existing space in a missile launch tube in terms of accommodating greater propellant loading.

BRIEF SUMMARY

In one embodiment, the present invention comprises a missile component in the form of a rocket motor case containing a propellant grain and having at least a portion of initial, non-circular transverse cross-sectional shape, which may be flexed into a second, different transverse cross-section responsive to application of internal pressure from ignition of a propellant grain therein. Such flexure may occur during a launch event, including without limitation after escape from a missile launch tube. In one embodiment, the initial, non-circular cross-section may comprise a substantially elliptical cross-section and the second, different transverse cross-sectional shape may comprise a substantially circular cross-section.

In yet another embodiment, the present invention comprises a multi-stage missile including at least a first stage and a second stage of a first, non-circular transverse cross-section, at least one of the stages being flexible, in response to application of internal pressure from ignition of a propellant grain therein, from the first, non-circular transverse cross-section to a second, different transverse cross-section.

In another embodiment, the present invention comprises a missile launch assembly including at least one missile having at least a component of non-circular transverse cross-section disposed within a segment of a partitioned circular launch tube. The non-circular transverse cross-section may be selected to maximize volume of the launch tube segment occupied by the missile and, specifically, a rocket motor case thereof. One suitable transverse cross-sectional configuration is a substantially elliptical cross-section.

In a further embodiment, the present invention comprises a method of launching a missile including igniting a rocket motor of a first, non-circular transverse cross-section missile component, internally pressurizing the missile component substantially concurrently with motor ignition and flexing the component into a second, different transverse cross-sectional shape. The method may, optionally, be effected in conjunction with ejection of the missile from a launch tube such as, without limitation, a partitioned launch tube of a missile-carrying submarine.

As used herein, the term "missile" includes, without limitation, a missile having a non-circular cross-section throughout substantially an entire length of a fuselage as well as a missile having non-circular cross-section throughout only a portion, or component, thereof. One non-limiting example of a non-circular component of a missile is a rocket motor case.

BRIEF DESCRIPTION OF THE SEVERAL VIEWS OF THE DRAWINGS

FIG. 1 is an illustration of an ellipse and its associated axes;

FIG. 1A is a schematic, transverse cross-sectional view of a missile launch tube partitioned into three equal segments and depicting the respective, available cross-sectional areas for a missile of circular cross-section and a missile of elliptical cross-section;

FIG. 1B is a schematic, transverse cross-sectional view of a missile launch tube partitioned diametrically into two equal segments and depicting the respective, available cross-sectional areas for a missile of circular cross-section and a missile of elliptical cross-section;

FIGS. 3A and 3B are schematic side and aft end elevations of a rocket motor case of an embodiment of the present invention prior to internal pressurization from propellant ignition;

FIGS. 4A and 4B are schematic side and aft end elevations of the rocket motor case of the embodiment of FIGS. 3A and 3B after internal pressurization and ejection from a launch tube;

FIGS. 5A and 5B are schematic side and aft end elevations of an embodiment of the invention comprising a multi-stage missile having first and second stages prior to internal pressurization from propellant ignition; and FIGS. 6A and 6B are schematic side and aft end elevations of the multi-stage missile of FIGS. 5A and 5B after internal pressurization of the first stage and ejection from a launch tube.

DETAILED DESCRIPTION OF THE INVENTION

Figure 2A:
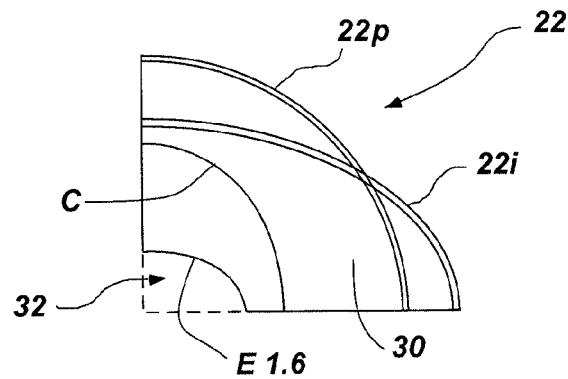
FIGS. 2A through 2C are schematic, quarter-sectional representations of various propellant configurations before and after pressurization of a rocket motor case in which the propellant is disposed, according to embodiments of the invention.

As noted above, propellant loading within a circular rocket motor case of a missile capable of fitting within a partitioned, circular rocket motor launch tube is severely constrained, and substantial unused cross-sectional area, greater than one-half of the total cross-sectional area, remains within the launch tube. As a result, a circular rocket motor case sized for disposition in a segment of a partitioned launch tube imposes significant limitations in terms of obtainable propellant grain volume. Therefore, it would be desirable to employ a rocket motor case of a non-circular cross-section that would reduce the unused cross-sectional area of the launch tube. Stated another way, it would be desirable to employ a rocket motor case of a cross-sectional configuration that would maximize the volume of a launch tube segment occupied by the rocket motor case and enclosed propellant grain. Cross-sectional configurations that are asymmetrical about a central axis provide such a capability.

One suitable asymmetric cross-sectional shape comprises an ellipse, which is of an arcuate shape having two perpendicular axes of unequal length. Thus, using a rocket motor case of substantially elliptical cross-section and sized to fit within a segment of a partitioned launch tube greatly enhances available cross-sectional area usable for propellant loading within the rocket motor case, in comparison to a rocket motor case of circular cross-section sized to fit within the same sized segment. As used herein, the term "substantially elliptical" includes and encompasses transverse cross-sections that are approximately, but not precisely, elliptical. Similarly, the term "substantially circular" includes and encompasses transverse cross-sections that are approximately, but not precisely, circular.

For example, with reference to FIG. 1A, it can easily be seen that missiles 10 with circular rocket motor cases 12 disposed in three-segment circular launch tube 14 partitioned at 120° intervals, leave an unacceptably high transverse unoccupied cross-sectional area 16 within launch tube segments 18a and 18b, and thus volume, within each partitioned launch tube segment 16. On the other hand, a missile 20 having an elliptical cross-section rocket motor case 22 consumes a much greater transverse cross-sectional area within a launch tube segment 18c of equal size to those within which circular rocket motor cases 12 may be disposed, leaving a significantly reduced unoccupied area 24. In the instance of an elliptical cross-section rocket motor case 22 having a 1.4 to 1 b/a (see FIG. 1) elliptical axis ratio, which is suited for deployment within a three-segment partitioned launch tube 14 as depicted in FIG. 1A, about 25% more propellant may be accommodated within an elliptical rocket motor case in comparison to that within a circular rocket motor case fitting into the same size launch tube segment 18a, 18b, 18c.

FIG. 1B depicts a diametrically partitioned, two-segment, circular launch tube 14 in which a missile 10 having a circular rocket motor case 12 is depicted disposed in one segment 18a at the top of the drawing figure, and a missile 20 having an elliptical rocket motor case 22 is disposed in the other segment 18b at the bottom thereof. In this launch tube partitioning arrangement, an elliptical rocket motor case having a 1.6 to 1 elliptical axis ratio may be deployed, wherein the achievable increased propellant loading is, remarkably, about 45% over that of a circular rocket motor case 12 fitting within the same shaped segment, the unoccupied cross-sectional area 16 within segment 18a vastly exceeding unoccupied area 24 within segment 18b. Of course, the appropriate elliptical ratio selected for as most suitable for a given missile system is dependent on parameters (case material properties, center bore size, etc.) other than, and in addition to, the number of partitions in a launch tube.

Stated in terms of relative attainable range for missiles fitting within the same-sized segment of a launch tube, a 32.5 inch diameter 44 foot missile using a Class 1.1 propellant and deployable in a partitioned, three-segment Trident missile D-5 launch tube, would offer a range of only about 1800 to 2000 nautical miles (nm) when a 1400 lb. throw weight including a 1000 lb. warhead is deployed. An elliptical missile of the same length and deployable in a like-sized launch tube segment, having a 1.4 to 1 ellipse ratio and having about 25% greater propellant loading capacity, with the same propellant and the same throw weight and warhead, is predicted to offer a range of about 2300 nm to 2500 nm.

In the instance of a diametrically partitioned D-5 launch tube, the largest usable circular cross-section missile, of 36 inch diameter and of 44 foot length, loaded with Class 1.1 propellant and having a throw weight of 1400 lb., would offer a range of only about 2300 nm to 2500 nm. An elliptical missile of the same length, deployable in a like-sized launch tube segment and having a 1.6 to 1 ellipse ratio and having about 45% greater propellant loading capacity, with the same propellant and the same throw weight and warhead, is predicted to offer a range of about 4300 nm to 4600 nm.

Rocket Motor Case

It is contemplated that a rocket motor case suitable for implementation of an embodiment of the present invention may comprise a housing fabricated from an isotropic metallic or non-isotropic, non-metallic material exhibiting a sufficiently high strain and low Young's modulus properties to enable flexure without failure from a first transverse cross-section to a second, different transverse cross-section. In one non-limiting example, a rocket motor case may be fabricated to deform from an initial, elliptical transverse cross-sectional shape to a circular transverse cross-sectional shape. Characterized another way, the rocket motor case must exhibit sufficient elasticity and tensile strength to flex from the first to the second, different transverse cross-section without failure. In practice, such flexure may be initiated at a relatively low internal pressure within the rocket motor case, on the order of 200 psi, as generated by the ignited propellant. This is within acceptable limits for maintaining propellant-to-case bonding.

By way of non-limiting example, the housing may comprise a steel or a material comprising aluminum such as an aluminum alloy (including without limitation lithium-aluminum) and, in some embodiments, may be fabricated from a composite material. Case wall thickness may be, for example, 0.25 inch, to withstand a 1000 psi internal motor pressure during ignition, launch and flight. Suitable composite materials may include KEVLAR® fiber, glass fiber or carbon fiber disposed within an epoxy resin matrix or a polyurethane resin matrix. Further, it is contemplated that fiber placement may be effected on a mandrel, as is known to those of ordinary skill in the art, using a filament winding process effected by a multi-axis apparatus, as known to those of ordinary skill in the art. One example of a suitable apparatus is a commercially available multi-axis machine; suitable apparatuses for filament winding include the 5K Series, available from Entec Composite Machines, Inc. of Salt Lake City, Utah, and the Titan, available from McClean Anderson of Schofield, Wis.

The fore and aft ends of the rocket motor case must likewise be sufficiently flexible to accommodate flexure of the housing from a first to a second, different transverse cross-section without failure. In the case of deformation of a rocket motor case from an elliptical shape to a circular shape, it is contemplated that ellipsoidal domes, which remain ellipsoidal when the rocket motor case is pressurized, can accommodate anticipated stresses without strain to failure during such housing flexure. It is also contemplated that circular domes with a dome diameter the same as the minor axis of an elliptical case, which remain circular when the rocket motor case is pressurized, may be suitable for some applications. The ellipsoidal or circular domes retain their respective shapes through use of dome materials of sufficient strength and stiffness such that the internal pressure loads do not circularize these structures.

It is also contemplated that a dome may be fabricated from a composite material to enable a dome to deflect from an initial ellipse to a circular shape when the case is pressurized. The fiber layup results in a ply angle change when the rocket motor is pressurized. The ply angle change, along with the dome contour, enables the dome to deform at case pressurization. The dome contour has a bulge along the minor ellipse axis when unpressurized, and the contour along the major axis has a bulge when the case is pressurized. This provides a constant dome arc length at each azimuth of the case.

To accommodate stresses during circularization of the housing, which subjects the housing and the domes to both bending and tensile stresses, if a composite rocket motor case is employed, the fibers of at least some adjacent layers are permitted to shift, as the initial layup angles will change with flexure of the case. Therefore, spacers may be placed between selected layers of fibers and portions of layers at flexure stress points, and a high strain capability resin matrix system may be employed.

Propellant

As implied above, it is contemplated that a solid fuel, Class 1.1 propellant will be employed within the rocket motor case. In one basic form, the propellant may comprise an oxidizer, a fuel and an elastomeric binder binding the oxidizer and fuel into a solid propellant grain. One suitable propellant is a Nitride Ester Poly Ether (NEPE) propellant, of a type currently employed in ballistic missiles by the United States Navy. Another potentially suitable propellant is a Hydroxy-terminated Poly Butadiene (HTPB) propellant. Yet another potentially suitable propellant is Hydroxy-terminated Poly Ether, (HTPE).

Propellant strain under stress of burning and of housing (rocket motor case) flexure is of concern, and a capability of withstanding at least 90% strain without propellant fragmentation is desirable. It is contemplated that a slotted bore propellant may be employed, with attendant relatively high strains that are offset by a much higher propellant loading capability due to the initially small cross-sectional area of the bore. A slotted bore comprises a plurality of relatively thin slots extending radially from a center bore of the propellant grain at the aft end thereof. The number and size of the slots may be employed to control internal pressurization of the rocket motor case as a function of time or, stated another way, the pressure versus time curve. Use of slots cast into the propellant grain provides an initial, high thrust capability with a lower thrust thereafter.

Notably, the use of a slotted bore propellant grain provides maximum propellant loading in conjunction with uniform pressurized grain geometry. Stated another way, when the rocket motor case deforms, so does the propellant grain bonded to it, so the initial configuration must be capable of providing a uniform grain and bore geometry after circularization. Use of a slotted bore grain may, however, require the use of NEPE, which exhibits a 150% strain capability to failure, due to the high degree of flexure of the propellant grain as the bore opens responsive to circularization of the case. HTPE is limited to 70% strain to failure and HTPB is limited to 30% strain to failure and, so, may not be suitable for some initial bore configurations, such as a slotted bore.

The propellant grain is formed by a casting process within a rocket motor case by disposing a mold mandrel centrally within the case for defining a center bore with, optionally, longitudinally extending, radial slots within the propellant grain when formed, pouring the propellant into the rocket motor case, permitting the propellant to cure into the propellant grain, and pulling the mold mandrel. Suitable transverse configurations for the propellant center bore, as formable by the mold mandrel, include a 1.6 ratio ellipse, a 3.0 ratio ellipse and a "dog bone" shape with a narrow neck, or mid-section and enlarged ends. The dog bone shape is a center bore configuration designed to maximize propellant loading and minimize propellant strain.

FIG. 2A depicts a quarter-section of an elliptical rocket motor case 22 with a propellant grain 30 disposed therein and bonded thereto. Reference numeral 22$i$ indicates the initial, elliptical motor case profile, while reference numeral 22$p$ indicates the circular rocket motor case profile after internal pressurization of the rocket motor case 22. Propellant grain 30 includes a longitudinal bore 32 having an initial elliptical transverse cross-section E 1.6 (1.6:1), which deforms to a substantially circular cross-section C responsive to internal pressure-induced deformation of propellant 30 bonded to rocket motor case 22.

Figure 2B:
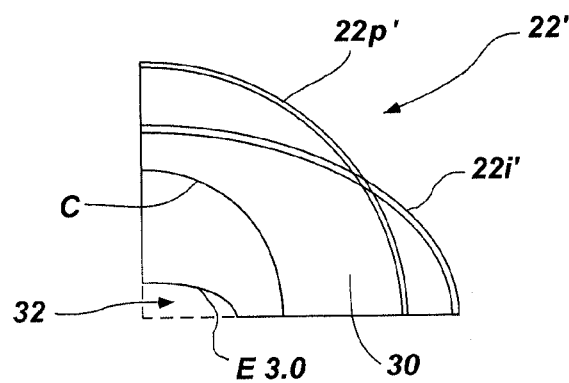

FIG. 2B depicts a quarter-section of another elliptical rocket motor case 22' with a propellant grain 30 disposed therein and bonded thereto. Reference numeral 22$i$' indicates the initial, elliptical motor case profile, while reference numeral 22$p$' indicates the circular rocket motor case profile after internal pressurization of the rocket motor case 22'. Propellant grain 30 includes a longitudinal bore 32 having an initial elliptical transverse cross-section E 3.0 (3.0:1), which deforms to a substantially circular cross-section C responsive to internal pressure-induced deformation of propellant grain 30 bonded to rocket motor case 22'.

Figure 2C:
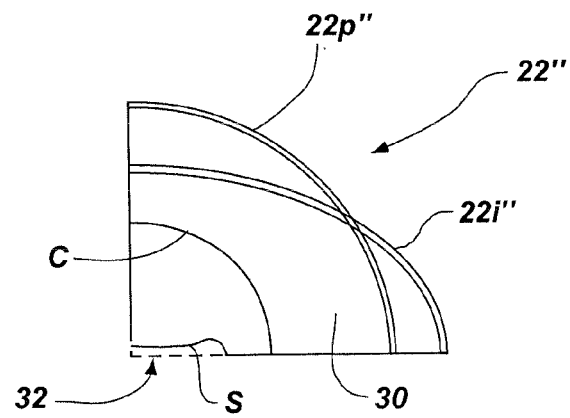

FIG. 2C depicts a quarter-section of an elliptical rocket motor case 22" with a propellant grain 30 disposed therein and bonded thereto. Reference numeral 22$i$" indicates the initial, elliptical motor case profile, while reference numeral 22$p$" indicates the circular rocket motor case profile after internal pressurization of the rocket motor case 22". Propellant grain 30 includes a longitudinal bore 32 having a transverse, elongated cross-section S, which may be characterized as a "dog bone" configuration due to its narrow neck or midsection and the enlarged ends thereof. The dog bone transverse cross-section S of bore 32 deforms to a substantially circular cross-section C responsive to internal pressure-induced deformation of propellant 30 bonded to rocket motor case 22".

As is conventional, a liner is disposed between the rocker motor case interior and the propellant grain. However, due to the flexure of the rocket motor case from one cross-sectional shape to another (for example, elliptical to circular shape), bond stresses between the rocket motor case and the end domes and the propellant may be accommodated by disposing a liner flap linearly on the side of the case and on the domes, between the case and propellant and between the domes and propellant to minimize strain between domes or casing and propellant. Use of a liner flap provides a conventional means for decoupling the solid propellant grain from the side of the rocket motor case and from the domes, during deformation of the rocket motor case from one transverse cross-sectional shape to another, different shape. This provides stress relief for the propellant grain. The need for a liner flap at a given location is rocket motor configuration-dependent and is not required in all instances.

Ports

It is further contemplated that the rocket motor ports may be formed initially in an oval, an elliptical or other suitable non-circular shape, which will also circularize during launch. As another approach, circular ports may also be employed.

As is conventional, an igniter for the propellant may be disposed in a longitudinally forward port in the rocket motor case assembly in the forward dome and a nozzle is associated with an aft port in the assembly, in the aft dome. The nozzle port is larger than the ignition port. In another arrangement, which is also conventional, the igniter may be disposed at the same longitudinal end of the rocket motor case, and attached to the nozzle.

Operation

Referring to FIGS. 3A and 3B and 4A and 4B, when a rocket motor 20 having an elliptical case 22 and fore and aft domed ends 42, 44 is disposed within a launch tube, the rocket motor 20, when viewed from the side (FIG. 3A) has a low profile. When viewed from the end, aft end 44 with nozzle 46 protruding therefrom, the elliptical shape is clearly apparent. Nozzle 46 may be gimbaled, as is known in the art. When igniter 48 of rocket motor 20 (as noted previously, igniter 48 may be positioned proximate either end of a rocket motor 20) is initiated after the missile in which rocket motor 20 is completely ejected (as by a steam pulse) from a launch tube, elliptical case 22 of rocket motor 20 quickly deforms into a circular shape, as depicted in FIGS. 4A and 4B. The ignition transient may be extremely short, on the order of 15 milliseconds (ms). As is also apparent from FIG. 4A, fore and aft domed ends 42, 44 may deform to accommodate the change in cross-sectional configuration of the rocket motor case 22 and, thus, contain the internal pressure generated from ignition and burning of propellant grain 30 to propel the missile with which rocket motor 20 is associated. As is also readily apparent from FIGS. 3A and 3B and as described previously with regard to FIGS. 2A through 2C, upon deformation of rocket motor case 22 under internal pressurization from propellant grain burn, bore 32 of propellant grain 30 opens from a collapsed configuration, such as an ellipse (FIGS. 2A and 2B) or a slot (FIG. 2C) into a circular shape. The propellant grain geometry and composition is designed to provide a desired internal motor pressure for a given propellant burn rate. Thus, nonuniform burning and potential fragmentation of propellant grain 30 or burn-through to rocket motor case 22 is prevented.

Multi-Stage Assembly

In some embodiments, the missile may comprise a multi-stage assembly. For example, two or more stages may be employed. In one multi-stage embodiment, the first and second stages may be formed in a non-circular, for example, elliptical, shape, but only the first stage is configured to circularize upon internal pressurization, for example, after exiting a launch tube. In another embodiment, both the first and second stages are configured to circularize upon internal pressurization responsive to ignition of their respective propellant grains.

As shown in FIGS. 5A and 5B, multi-stage missile 50 includes first and second stages 52 and 54, and payload 56, which may comprise, without limitation, a warhead and control electronics, as is conventional. The rocket motors for first and second stages 52, 54 may be configured as previously described herein. As disposed in a launch tube, missile 50 exhibits an elliptical cross-sectional configuration (FIG. 5A). After ejection from a launch tube in a conventional manner and subsequent ignition of the rocket motor of first stage 52, the rocket motor case of first stage 52 deforms into a circular cross-section (FIGS. 6A and 6B), while second stage 54 retains its initial elliptical shape. Mechanical connection between first and second stages 52, 54 is effected through interstage section 58 during deformation of first stage 52. A raceway (not shown), as is conventional, extends through interstage section 58 and provides a location for electrical wiring and conduits, which provide electrical connections to, and control for, the first stage 52. After completion of the burn of first stage 52, it is detached from second stage 54 in a conventional manner, and the propellant of second stage 54 ignited, upon which second stage 54 also deforms into a circular cross-sectional shape.

OTHER APPLICATIONS

Embodiments of the invention have been described herein with respect to use in conjunction with a partitioned launch tube carried, for example, by a submarine. However, it is contemplated that the present invention may have utility for any application wherein cross-sectional space for deployment of ordnance comprising a rocket motor is limited, or enhanced propellant grain volume is required or desired. Thus, land vehicles, as well as aerospace vehicles, may carry missiles having rocket motors configured in accordance with embodiments of the present invention.

While the invention is susceptible to various modifications and alternative forms, specific embodiments of which have been shown by way of non-limiting example in the drawings and have been described in detail herein, it should be understood that the invention is not limited to the particular forms disclosed. Rather, the invention includes all modifications, equivalents, and alternatives falling within the scope of the invention as defined by the following appended claims and their legal equivalents.

The invention claimed is:

1. A missile component, comprising:
   a propellant grain having a central longitudinal bore therein; and
   a longitudinally extending rocket motor case of a first transverse, non-circular, substantially elliptical cross-sectional shape containing the propellant grain, the rocket motor case comprising a material exhibiting a sufficiently high strain and low Young's modulus properties to enable flexure without failure, under internal pressure generated within the rocket motor case responsive to ignition of the propellant grain, substantially from the first transverse, non-circular, substantially elliptical cross-sectional shape to a second, different substantially circular transverse cross-sectional shape.

2. The missile component of claim 1, wherein the central longitudinal bore of the propellant grain has a transverse cross-sectional configuration selected from the group consisting of a non-circular, elliptical configuration and a dog bone configuration having a narrow neck and enlarged ends.

3. The missile component of claim 1, wherein the propellant grain is bonded to the rocket motor case and is formulated to deform from a non-circular, substantially elliptical transverse cross-sectional shape to a substantially circular transverse cross-sectional shape without substantial fragmentation with flexure of the rocket motor case, and to alter a transverse cross-sectional configuration of the central longitudinal bore to a substantially circular cross-section with the deformation.

4. The missile component of claim 1, wherein the propellant grain comprises an oxidizer, a fuel and an elastomeric binder.

5. The missile component of claim 1, wherein the propellant grain is selected from the group consisting of Nitride Ester Poly Ether (NEPE), Hydroxy-terminated Poly Butadiene (HTPB), and Hydroxy-terminated Poly Ether, (HTPE).

6. The missile component of claim 1, wherein a material of the rocket motor case is selected from the group consisting of a steel, a material comprising aluminum, and a composite material.

7. The missile component of claim 1, further comprising an igniter proximate one longitudinal end of the rocket motor case and a nozzle at an opposing longitudinal end thereof.

8. A multi-stage missile, comprising:
at least two stages, wherein each stage of the at least two stages comprises:
a propellant grain having a longitudinal bore therein; and
a longitudinally extending rocket motor case of non-circular transverse cross-section containing the propellant grain;
wherein the rocket motor case of at least one stage of the at least two stages comprises a material exhibiting sufficient elasticity and tensile strength to deform without failure, under internal pressure generated responsive to ignition of the propellant grain contained therein, from the non-circular transverse cross-section to a substantially circular transverse cross-section.

9. The multi-stage missile of claim 8, wherein the longitudinal bore of the propellant grain has a transverse cross-sectional configuration selected from the group consisting of a non-circular, elliptical configuration and a dog bone configuration having a narrow neck and enlarged ends.

10. The multi-stage missile of claim 9, wherein the propellant grain is bonded to the rocket motor case and is formulated to deform from a non-circular, substantially elliptical transverse cross-sectional shape to a substantially circular transverse cross-sectional shape without substantial fragmentation with flexure of the rocket motor case of the at least one stage and alter a transverse cross-sectional configuration of the longitudinal bore to a substantially circular cross-section responsive to the deformation.

11. The multi-stage missile of claim 8, wherein the propellant grain comprises a solid propellant including an oxidizer, a fuel and an elastomeric binder.

12. The multi-stage missile of claim 8, wherein the propellant grain is selected from the group consisting of Nitride Ester Poly Ether (NEPE), Hydroxy-terminated Poly Butadiene (HTPB), and Hydroxy-terminated Poly Ether, (HTPE).

13. The multi-stage missile of claim 8, wherein a material of the rocket motor case of each stage is selected from the group consisting of a steel, a material comprising aluminum, and a composite material.

14. The multi-stage missile of claim 8, further comprising an igniter proximate a longitudinal end of the rocket motor case of each stage and a nozzle at an opposing longitudinal end thereof.

15. A missile launch assembly, comprising:
at least one substantially circular missile launch tube partitioned into at least two segments along at least a portion of a diameter of the missile launch tube, each segment sized and configured to receive a rocket motor case; and
at least one segment of the at least two segments of the launch tube having disposed therein a missile having a rocket motor case of non-circular cross-section;
wherein the missile launch tube is configured to eject the missile from an end of the launch tube and substantially along the longitudinal axis of the launch tube.

16. The missile launch assembly of claim 15, wherein the non-circular cross-section is selected to maximize a volume of the at least one segment occupied by the missile.

17. The missile launch assembly of claim 15, wherein the at least two segments comprise two segments separated along a diameter of the missile launch tube or three equal segments partitioned at 120° intervals.

18. The missile launch assembly of claim 15, wherein the at least two segments comprise two diametrically separated segments, and the rocket motor case is of elliptical transverse cross-section, the ellipse having a 1.6 to 1 elliptical axis ratio.

19. The missile launch assembly of claim 15, wherein the at least two segments comprise three equal segments partitioned at 120° intervals, and the rocket motor case is of elliptical cross-section, the ellipse having a 1.4 to 1 elliptical axis ratio.

20. A method of launching a missile, comprising:
igniting a propellant grain having a central longitudinal bore therein of a missile comprising a longitudinally extending rocket motor case of a first non-circular, substantially elliptical transverse cross-sectional shape containing the propellant grain, the rocket motor case comprising a material exhibiting a sufficiently high strain and low Young's modulus properties to enable flexure without failure under internal pressure generated within the rocket motor case responsive to ignition of the propellant grain substantially from the first transverse, non-circular, substantially elliptical cross-sectional shape to a second, different substantially circular transverse cross-sectional shape; and
altering the first non-circular, substantially elliptical transverse cross-section of the rocket motor case to the second, different substantially circular transverse cross-section responsive to internal pressure generated within the rocket motor case responsive to ignition of the propellant grain.

21. The method of claim 20, further, comprising:
disposing the missile in one segment of a partitioned, multi-segment launch tube;
ejecting the missile from the launch tube; and
igniting the propellant grain after ejection of the missile from the launch tube.

22. The method of claim 20, further comprising:
deforming a transverse cross-section of a bore of the propellant grain responsive to alteration of the transverse cross-section of the rocket motor case.

* * * * *